Nov. 3, 1942.    J. B. PHIPPS    2,301,079
BODY AND FENDER TOOL
Filed May 7, 1941

Inventor
JESSE B. PHIPPS
By Adam E. Fisher
Attorney

Patented Nov. 3, 1942

2,301,079

UNITED STATES PATENT OFFICE 2,301,079

BODY AND FENDER TOOL

Jesse B. Phipps, Jefferson City, Mo., assignor of one-half to Beecher Coleman, Jefferson City, Mo.

Application May 7, 1941, Serial No. 392,263

2 Claims. (Cl. 81—15)

This invention relates to body and fender tools for repairing damage to fenders of automobiles. The main object of the invention is to provide a relatively simple and practical tool for the use of mechanics, and whereby they may conveniently repair dents, scores and furrows as frequently impressed upon automobile fenders by careless drivers, or through accident.

Another object of the invention is to provide a tool of the kind referred to, comprising a pair of levers, crossed and pivotally connected adjacent their forward ends and being formed thereat for engaging the opposite sides of an automobile fender at either side of a rent, rupture or fracture, for the purpose of pressing the misaligned surfaces of such fender back into normal alignment for welding the aligned margins together.

With the foregoing and such other objects and advantages in view, as may appear from the following specification, attention is directed to the accompanying drawing, wherein.

Figure 1:
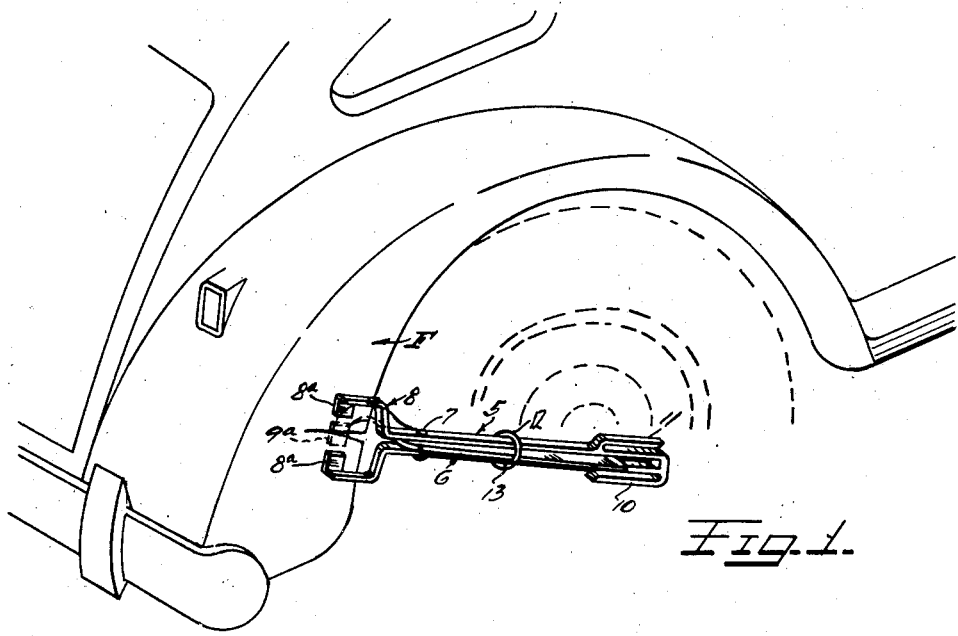
Figure 1 is a perspective view of the tool as applied in use upon an automobile fender.
Figure 2:
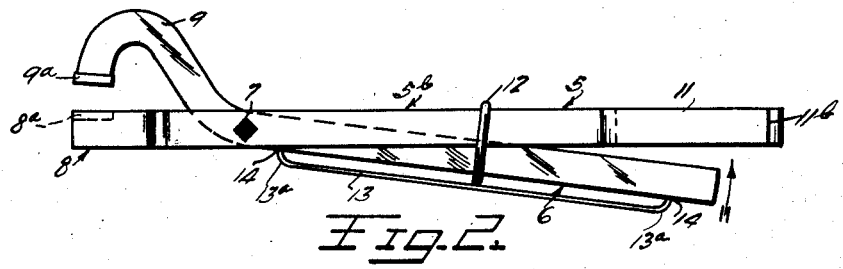
Figure 2 is a side elevation of the tool as opened for use.
Figure 3:
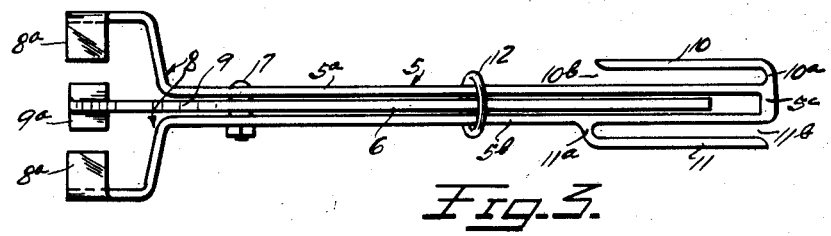
Figure 3 is a top plan view of the tool as shown in Figure 2.
Figure 4:
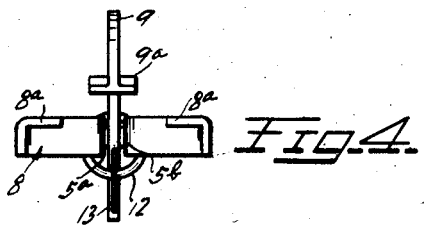
Figure 4 is an end view showing the jaws opened.

The invention comprises a doubled or bifurcated spacer or supporting lever 5, including a pair of flat bars 5a, 5b joined rigidly together at their rear ends as shown at 5c and spaced evenly apart forwardly as indicated, and a work aligning lever 6 constructed of a single flat bar crossed and freely mounted between the two bars 5a, 5b of the lever 5, and pivoted thereto by means of a bolt 7 passed through the forward necks of the bars 5a, 5b and inserted lever 6, at a point spaced back from the extremities thereof, as shown.

The extremities of the bars 5a, 5b are spread or flared laterally to form an open, Y-shaped spacer jaw or fork 8, the inner margins thereof being extended and turned inwardly in a common plane to form shoes or work rests 8a.

The corresponding end of the work aligning lever 6 is formed into an over-hanging gooseneck 9, the tip thereof being spread laterally to form a head 9a adapted to pass between the shoes or rests 8a and to approximately align at its surface with the upper surfaces of the rests 8a of the under lever 5, when the two levers are closed together.

At the rear ends of the bars 5a, 5b as joined at 5c, open and reversely turned work loops 10, 11 are rigidly mounted, these loops being disposed at the sides of the bars 5a, 5b, one being rigidly joined thereto at the joint 5c as indicated at 10a and extending and opening forwardly as indicated at 10b, and the other being rigidly joined to the other bar as indicated at 11a, and extending and opening rearwardly as indicated at 11b. Thus the forwardly extended free end of the loop 10 stands in substantial transverse alignment with the base of the other loop 11, while the rearwardly extended free end of the loop 11 lies in substantial transverse alignment with the base of the loop 10 and the rear end of the tool as a whole. Thus the lateral spread of the loops 10, 11, form a substantial handle for the tool as a whole, in the use of the same. Additionally these open loops provide means for engaging the edges of automobile fenders or other work, for bending and straightening same where bent out of shape.

A ring 12 may be freely and slidably mounted over the levers 5a, 5b and 6, to hold these levers in proper working relationship. This ring may be confined slidably in place by means of a rod 13 with ends 13a bent to one side and seated at 14 in the outer edge of the work aligning lever 6. Additional to thus confining the ring 12, the rod 13 affords a handle for pulling the lever 6 from its seat within the lever 5.

In use the levers 5 and 6 are opened apart and positioned at the under and upper sides of a dented or bent, or ruptured fender F. The levers are then closed together by forcing the lever 6 down into the double lever 5, and drawing the ring 12 out to lock the levers in their closed position upon the work. This operation forces the head 9a into alignment with the rests 8a, thereby straightening the intervening metal of the fender or other work and aligning ruptured margins for welding. By positioning the rests 8a at the upper side of the work, the welding tools may be readily applied to the work between the spaced rests 8a. The work-loops 10, 11 form auxiliary means for furthering the repair work, and also provide a suitable handle for the tool as a whole.

While I have here shown and described a certain embodiment of the invention and certain structural features thereof, the tool may be changed or modified as desired, in details within the scope of the claims.

I claim:

1. In a tool of the kind described, a pair of flat supporting bars joined rigidly together at their rear ends and extended forwardly with their planes in parallel spaced relation, the forward ends of said bars being spread laterally as a fork and the extremities of the fork being turned flatly inwardly toward one another at the inner margins of the bars as work rests lying in a common plane, a flat work-aligning lever mounted freely between the supporting bars, a pivot pin connecting the supporting bars and work-aligning lever adjacent their forward ends, the forward end of the work aligning lever being formed as an outwardly turned goose-neck with its extremity flattened laterally as a head extended in parallelism with the plane of the work rests of the supporting bars, and adapted for closing to approximate alignment therewith.

2. In a tool according to claim 1, means for releasably locking the supporting bars and work aligning lever together upon the work.

JESSE B. PHIPPS.